(12) United States Patent
Masuko et al.

(10) Patent No.: US 9,880,630 B2
(45) Date of Patent: Jan. 30, 2018

(54) USER INTERFACE DEVICE, USER INTERFACE METHOD, PROGRAM, AND COMPUTER-READABLE INFORMATION STORAGE MEDIUM

(71) Applicant: Rakuten, Inc., Tokyo (JP)

(72) Inventors: Soh Masuko, Tokyo (JP); Masato Hagiwara, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/433,381

(22) PCT Filed: Oct. 3, 2013

(86) PCT No.: PCT/JP2013/076903
§ 371 (c)(1),
(2) Date: Apr. 3, 2015

(87) PCT Pub. No.: WO2014/054718
PCT Pub. Date: Apr. 10, 2014

(65) Prior Publication Data
US 2015/0261300 A1 Sep. 17, 2015

Related U.S. Application Data

(60) Provisional application No. 61/709,215, filed on Oct. 3, 2012.

(51) Int. Cl.
*G06F 3/01* (2006.01)
*G06F 3/0482* (2013.01)
(Continued)

(52) U.S. Cl.
CPC .............. *G06F 3/017* (2013.01); *G06F 3/005* (2013.01); *G06F 3/011* (2013.01); *G06F 3/0482* (2013.01); *G06F 3/04842* (2013.01)

(58) Field of Classification Search
CPC . G06F 3/002; G06F 3/005; G06F 3/01; G06F 3/011; G06F 3/017; G06F 3/033;
(Continued)

(56) References Cited

U.S. PATENT DOCUMENTS 8,402,391 B1 * 3/2013 Doray ................... G06F 3/0482
715/834
8,515,890 B2 8/2013 Zadeh
(Continued)

FOREIGN PATENT DOCUMENTS

JP        S58-004424 A      1/1983
JP        2009-301215       12/2009
(Continued)

OTHER PUBLICATIONS

Tomonari Sonoda and Yoichi Muraoka, "A Letter Input System of Handwriting Gesture", The Institute of Electronics, Information and Communication Engineers, Jul. 1, 2003, IEICE Transactions on Information and Systems, D-II J86-D-II(7), pp. 1015-1025. See partial translation of the document.
(Continued)

*Primary Examiner* — Nathan Danielsen
(74) *Attorney, Agent, or Firm* — Hubbs, Enatsky & Inoue PLLC

(57) ABSTRACT

To enable a user to easily select a selection element, a user interface device includes image capturing means for capturing an image of a user viewing a display screen, recognition means for recognizing the position of a reference part of the user's body appearing in the captured image, which differs from a selection position that is a position for the user to select a selection element displayed on the display screen, display position determination means for determining a display position of the selection element based on the position of the reference part appearing in the image, and
(Continued)

display means for displaying the selection element in the determined display position.

13 Claims, 21 Drawing Sheets

(51) Int. Cl.
*G06F 3/0484* (2013.01)
*G06F 3/00* (2006.01)

(58) Field of Classification Search
CPC ... G06F 3/0346; G06F 3/048–3/04883; G06K 9/00335–9/00355
See application file for complete search history.

(56) References Cited

U.S. PATENT DOCUMENTS

| | | |
|---|---|---|
| 2002/0071607 A1 | 6/2002 | Kawamura et al. |
| 2008/0235621 A1 | 9/2008 | Boillot |
| 2009/0027337 A1* | 1/2009 | Hildreth ............... G06F 3/0482 345/158 |
| 2010/0090945 A1 | 4/2010 | Lee et al. |
| 2010/0231512 A1* | 9/2010 | Perez ..................... G06F 3/011 345/158 |
| 2010/0306702 A1* | 12/2010 | Warner ................ G06F 3/0482 715/834 |
| 2011/0041100 A1* | 2/2011 | Boillot .................. G06F 3/011 715/863 |
| 2011/0279379 A1* | 11/2011 | Morwing .............. G06F 3/0237 345/173 |
| 2011/0305398 A1* | 12/2011 | Sakakibara ........... G06K 9/222 382/203 |
| 2012/0038652 A1 | 2/2012 | Yang |
| 2012/0252539 A1* | 10/2012 | Hasegawa ........... G06F 3/04883 455/566 |
| 2013/0069867 A1 | 3/2013 | Watanabe |

FOREIGN PATENT DOCUMENTS

| | | |
|---|---|---|
| JP | 2010-534895 | 11/2010 |
| JP | 2011-258130 | 12/2011 |
| WO | 2011/024282 A1 | 3/2011 |
| WO | WO 2011074465 A1 * | 6/2011 ............. G06F 3/041 |

OTHER PUBLICATIONS

Kumiko Tanaka-Ishii, Yusuke Inutsuka, and Masato Takeichi, "Japanese Text Entry with Digits—Can Japanese be Estimated Only From Consonants?", Information Processing Society of Japan, Oct. 2002, IPSJ Journal, vol. 43 No. 10, pp. 3087-3096. See English abstract in the document.

English Translation of International Search Report for PCT/JP2013/076901 dated Oct. 29, 2013.

English Translation of International Search Report for PCT/JP2013/076902 dated Oct. 29, 2013.

English Translation of International Search Report for PCT/JP2013/076903 dated Oct. 29, 2013.

* cited by examiner

FIG.10

| | ↖ | ↑ | ↗ | ← | • | → | ↙ | ↓ | ↘ |
|---|---|---|---|---|---|---|---|---|---|
| ↖ | 0 | 1 | 2 | 1 | 1 | 2 | 2 | 2 | 3 |
| ↑ | 1 | 0 | 1 | 2 | 1 | 2 | 2 | 3 | 2 |
| ↗ | 2 | 1 | 0 | 2 | 1 | 1 | 3 | 2 | 2 |
| ← | 1 | 2 | 2 | 0 | 1 | 3 | 1 | 1 | 2 |
| • | 1 | 1 | 1 | 1 | 0 | 1 | 1 | 1 | 1 |
| → | 2 | 2 | 1 | 3 | 1 | 0 | 2 | 2 | 1 |
| ↙ | 2 | 2 | 3 | 1 | 1 | 2 | 0 | 1 | 2 |
| ↓ | 2 | 3 | 2 | 2 | 1 | 2 | 1 | 0 | 1 |
| ↘ | 3 | 2 | 2 | 2 | 1 | 1 | 2 | 1 | 0 |

FIG.11

| | | | ↑ | ↑ | ↑ | ↗ | ↑ | ↖ | ↖ | ↑ | ↑ | ↗ | → | ↗ | → | ↘ | ↘ |
|---|---|---|---|---|---|---|---|---|---|---|---|---|---|---|---|---|---|
| | | ↗ | 1 | 1 | 1 | 0 | 1 | 2 | 2 | 1 | 1 | 0 | 1 | 0 | 1 | 2 | 2 |
| | | ↗ | 1 | 1 | 1 | 0 | 1 | 2 | 2 | 1 | 1 | 0 | 1 | 0 | 1 | 2 | 2 |
| | | → | 2 | 2 | 2 | 1 | 2 | 2 | 2 | 2 | 2 | 1 | 0 | 1 | 0 | 1 | 1 |
| | | ↘ | 2 | 2 | 2 | 2 | 2 | 3 | 3 | 2 | 2 | 2 | 1 | 2 | 1 | 0 | 0 |
| | | ↘ | 2 | 2 | 2 | 2 | 2 | 3 | 3 | 2 | 2 | 2 | 1 | 2 | 1 | 0 | 0 |

INPUT DATA — IN TEMPORAL ORDER →

TEMPLATE — IN TEMPORAL ORDER ↓

| A | A | A | A | A |

(b)

|   |   | E | E | E | E | E |
| F | F | F | F |   |   |   |

(c)

|   |   | H | H | H | H | H | H |
| 1 | 1 | 1 | 1 | 1 |   |   |   |
|   |   |   |   |   | 2 | 2 | 2 |

FIG.15

| WORD | KANA TO INDICATE PRONUNCIATION | PART OF SPEECH |
|---|---|---|
| 楽天 | らくてん | NOUN |
| 力点 | りきてん | NOUN |
| 理科 | りか | NOUN |
|  |  |  |

FIG.16

| あ | a |
|---|---|
| い | i |
| う | u |
| え | e |
| お | o |

| か | k , ka |
|---|---|
| き | k , ki |
| く | k , ku |
| け | k , ke |
| こ | k , ko |

| さ | s , sa |
|---|---|
| し | s , sh , si , shi |
| す | s , su |
| せ | s , se |
| そ | s , so |

FIG.17

| WORD | ROMAN ALPHABET STRING | PART OF SPEECH |
|---|---|---|
| 楽天 | rktn , rakuten , raktn , rkutn<br>rkten , rakutn , rakten , rkuten | NOUN |
| 力点 | rktn , rikiten , riktn , rkitn<br>rkten , rikitn , rikten , rkiten | NOUN |
| 理科 | rk , rika , rik , rka | NOUN |

USER INTERFACE DEVICE, USER INTERFACE METHOD, PROGRAM, AND COMPUTER-READABLE INFORMATION STORAGE MEDIUM

CROSS REFERENCE TO RELATED APPLICATIONS

This application is a National Stage of International Application No. PCT/JP2013/076903 filed on Oct. 3, 2013, which claims priority to U.S. Provisional Patent Application No. 61/709,215 filed on Oct. 3, 2012. The contents of each of the above documents are incorporated herein by reference in their entirety.

TECHNICAL FIELD

The present invention relates to a user interface device, a user interface method, a program, and a computer-readable information storage medium, and particularly to a user interface technology for selecting a menu item using an image of a user.

BACKGROUND ART

There is known a user interface that displays a user and a plurality of menu items on a display device and enables the user to select a desired menu item by moving a specific part of the user's body, such as his/her hand, to locate the display position of the particular part over the display position of the menu item. Here, the menu items are displayed in fixed positions on the display screen.

CITATION LIST

Patent Literature

[Patent Literature 1] JP 2009-301215 A

SUMMARY OF INVENTION

Technical Problem

A camera is arranged at a freely-selected position around the display device and shoots the user in front of the display device. However, the user does not always appear at the center of the captured image. Thus, if the menu items are displayed in the fixed positions on the display screen as disclosed in the known art, the display position of the specific part of the user's body may be far from the display positions of the menu items. In such a case, the user have to reach out his/her part, such as his/her hand, to select a menu item, which is difficult to operate.

In view of the above problem, it is an object of the present invention to provide a user interface device, a user interface method, a program, and a computer-readable information storage medium that enable a user to easily select a selection element.

Solution to Problem

To solve the above problem, a user interface device according to the present invention includes image capturing means for capturing an image of a user viewing a display screen, recognition means for recognizing a position of a reference part of the user's body appearing in the captured image, the position differing from a selection position that is a position for the user to select a selection element displayed on the display screen, display position determination means for determining a display position of the selection element based on the position of the reference part appearing in the image, and display means for displaying the selection element in the determined display position.

Here, the reference part may be a joint of the user's hand or arm. The selection position may be a portion of the user's hand or arm, where the portion is nearer to a tip of the hand than the reference part. The reference part may be the user's shoulder.

The display position determination means may determine, as the display position of the selection element, a position being along a predetermined-shaped line arranged in a position being a given distance from the position at which the reference part is displayed.

An area near to the position at which the reference part is displayed than the line may be defined as an area in which the user makes any gestures.

A button image may be displayed in an area outside the line when viewed from the position at which the reference part is displayed.

Distance calculation means for calculating a distance between the selection position and the position at which the reference part is displayed may be further included. The given distance may be determined based on the calculated distance. The line may be in a form of a circular arc or an elliptical arc.

The display position determination means may determine display positions of a plurality of the selection elements, and the display position of each of the selection elements may be determined based on its priority and the position of the selection position.

A user interface method according to the present invention includes the steps of capturing an image of a user viewing a display screen, recognizing a position of a reference part of the user's body appearing in the captured image, the position differing from a selection position that is a position for the user to select a selection element displayed on the display screen, determining a display position of the selection element based on the position of the reference part appearing in the image, and displaying the selection element in the determined display position.

A program according to the present invention causes a computer to function as image capturing means for capturing an image of a user viewing a display screen, recognition means for recognizing a position of a reference part of the user's body appearing in the captured image, the position differing from a selection position that is a position for the user to select a selection element displayed on the display screen, display position determination means for determining a display position of the selection element based on the position of the reference part appearing in the image, and display means for displaying the selection element in the determined display position. The program may be stored in a computer-readable information storage medium.

BRIEF DESCRIPTION OF DRAWINGS

FIG. 10 is a diagram schematically showing an example of a cost table used in DP matching.

FIG. 11 is a diagram explaining the DP matching.

FIG. 13 is a diagram explaining a criterion for determining candidate characters.

FIG. 15 is a diagram showing a base dictionary.

FIG. 16 is a diagram showing a transliteration table.

FIG. 17 is a diagram showing a transliterated dictionary.

DESCRIPTION OF EMBODIMENTS

An embodiment of the present invention is described in detail below with reference to the drawings.

Figure 1:
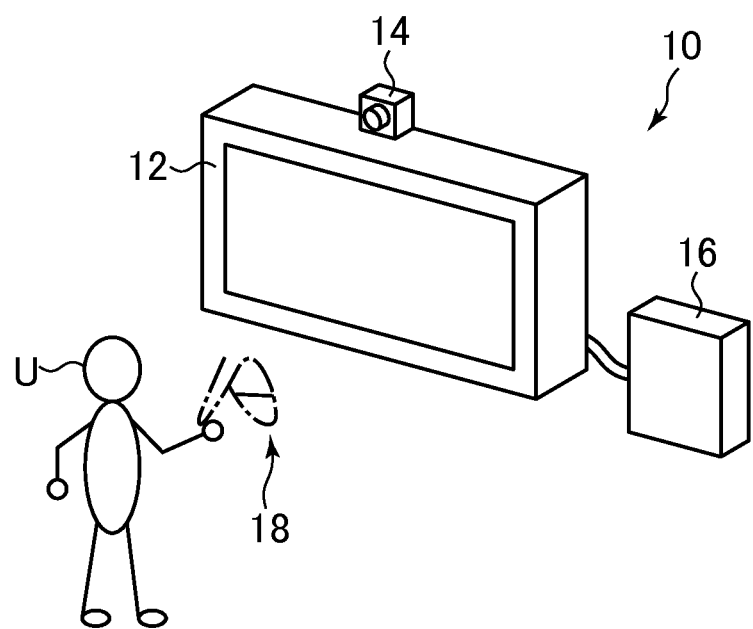
FIG. 1 is an external perspective view of a user interface device according to an embodiment of the present invention.

FIG. 1 is an external perspective view of a user interface device according to the embodiment of the present invention. As shown in the figure, a user interface device 10 includes a display device 12, such as a television or a PC monitor, a space sensing device 14, and a main unit 16. The main unit 16 is a computer such as a personal computer or a computer gaming system. The display device 12 and the space sensing device 14 are connected to the main unit 16.

The space sensing device 14 has the function of shooting front views in real time to capture two-dimensional images as a movie camera and the function of obtaining information (depth maps) about the distance of each position in the two-dimensional images (frame images) captured by the movie camera as a distance sensor (depth sensor). The distance sensor, for example, may emit a specific two-dimensional pattern of infrared light frontward, capture it with an infrared camera, and calculate the distance to each position in the image showing the front view based on the difference between the captured two-dimensional pattern and the original two-dimensional pattern. Alternatively, the time from when laser light is emitted from the distance sensor to when the laser light, reflected by a front object, returns to the distance sensor again may be measured for the distance. In this case, if the laser light is scanned, distance information can be obtained over a wide range. Other various types of distance sensors are known, and they can be used as appropriate. The space sensing device 14 can obtain a moving image showing front views and information (depth maps) about the three-dimensional coordinates of each position appearing in the frame images constituting the moving image by the above two functions.

The space sensing device 14 is arranged on the display device 12 to face in the direction in which the display surface of the display device 12 faces. When a user U makes motions (gestures) to write characters in the air standing or sitting in front of the display device 12, a moving image and depth maps showing how the user U is doing are input into the main unit 16. The main unit 16 is configured to recognize a sequence of the three-dimensional position coordinates of the user U's dominant hand (here assume that it is his/her right hand), as described below, from the moving image and the depth maps. The characters the user wrote are recognized based on a trajectory 18 of the hand position.

Figure 2:
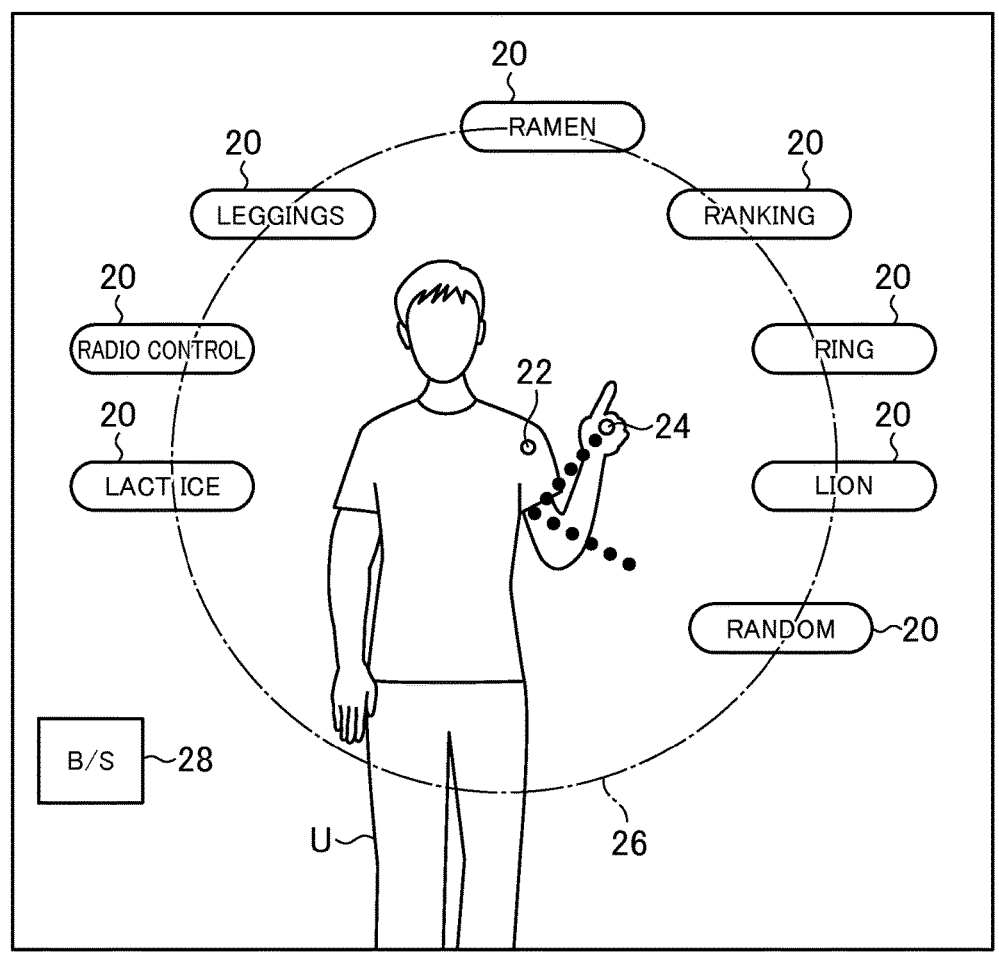
FIG. 2 is a diagram showing an example of a user interface image displayed on a screen.

FIG. 2 shows an example of a user interface image displayed on the screen of the display device 12. As shown in the diagram, a horizontally-flipped moving image (mirror image) of a moving image captured by the space sensing device 14 is displayed as a background on the entire screen. The moving image here shows the user U.

Selection candidate images (selection elements) 20 indicating candidates for conversion character strings are substantially evenly spaced on the circumference of a virtual circle 26 (invisible) centered at the position 22 at which the shoulder near the user U's dominant hand, that is, the right shoulder (reference part) is displayed. By locating the display position of the right hand over one of the selection candidate images 20, the user can select the conversion character string indicated by the one selection candidate image 20. The selected conversion character string is transferred to, for example, other programs and is used as a search keyword or an outgoing message in communication tools, such as a mail. The selection elements are not limited to the above elements indicating candidates for conversion character strings, and may be images indicating other character strings or text data themselves. Alternatively, the selection elements may be photographic images of, for example, goods on an e-commerce site. Outside the circle 26, a button image 28 for activating a specific function, such as a backspace button image for deleting input characters, is also arranged. The user U can activate the specific function by placing the right hand on the button image 28. Here, the diameter of the circle 26 may be determined, based on the length of the user U's arm when displayed on the screen, to be 80 percent of the length, for example. Alternatively, the diameter may be determined, based on the average length of human arms when displayed on the screen, to be 80 percent of the length, for example.

Inside the circle 26, an area (air-writing area) where the user U makes motions to write characters with the dominant hand is defined. The air-writing area may be a circular area. The circular area may be concentric with the circle 26 and have a diameter smaller than that of the circle 26. The user U writes any characters with his/her right hand with the position 24, at which the right hand is displayed, within the air-writing area. The position 24 of the right hand is identified by the main unit 16 at predetermined intervals, and a predetermined number of the positions taken in order from a newly identified position are displayed as identification images, such as O marks, on the screen (black dots in the diagram). If the position 24 of the right hand moves out of the air-writing area, character recognition based on the identified positions 24 may be suspended. This allows a motion to move the right hand on the selection candidate image 20 made by the user U to be distinguished from a motion to write characters, thus improving processing efficiency.

The user interface shown in the diagram displays a horizontally-flipped image of the user U as well as a trajectory of the position 24 of the dominant hand indicated by the images such as O marks. Thus, the user U can easily understand what character he/she is writing in the air-writing area from such contents on the screen. The user cannot move the position 24 of his/her dominant hand to the selection candidate image 20 or the button image 28 unless reaching out. This prevents the user U selecting the selection candidate image 20 or the button image 28 by mistake while writing characters.

The main unit 16 calculates, based on the moving image and the depth maps obtained by the space sensing device 14, the three-dimensional position coordinates of main body parts of a person appearing in the moving image. To calculate the three-dimensional position coordinates of the main body parts of the person, including the positions of both shoulders and both hands, from the moving image and the depth maps, the main body parts of the person appearing in the moving image are recognized, and the three-dimensional coordinates of them are obtained from the moving image and the depth maps, for example. The position of the body parts not appearing in the moving image can be interpolated from the previous and following moving images and depth maps, or be estimated from the three-dimensional position coordinates of other body parts connected with the body parts. For example, Microsoft Corporation's Kinect can make the calculation results easily available. Then, the position 22 of the shoulder near the dominant hand and the position 24 of the dominant hand are obtained by projecting the identified positions onto a projection plane virtually arranged in front of the space sensing device 14.

It is assumed here that the user U's right hand is a writing part for making gestures to write characters and selecting part for selecting the selection candidate image 20 and that the position 24 of the right hand is a writing position and a selection position. However, if the user U is left-handed, his/her left hand may be the writing part and the selecting part, and the position of the left hand may be the writing position and the selection position. Alternatively, other body parts other than hands, such as a finger, may be the writing part and the selecting part. It is assumed in the above description that the position of the dominant hand is the selection position and that the shoulder near the dominant hand is the reference part. Alternatively, apart that is nearer to the trunk than the selection position and has a joint to move the selection part may be appropriately selected as the reference part depending on the type of the selection position. For example, the position of a fingertip may be the selection position, and a wrist may be the reference part. Identification of the position at which the hand is displayed is not limited to the above method. For example, when the user U is wearing a gloves of a specific color, the position of the specific color may be identified as the writing position and the selection position from the moving image. Alternatively, directly writing characters and selecting the selection candidate image 20 with a hand may be substituted by writing characters and selecting the selection candidate image 20 with an object of some kind, such as a stick object that resembles a writing instrument. In this case, the position of the tip of the object corresponds to the selection position. For example, when the user U writes characters with an object of a specific color and/or a specific shape in his/her hand, the display position of the tip of the object may be identified as the writing position and the selection position based on the color or the shape. In such a case, the space sensing device 14 is not necessarily required and can be substituted by a movie camera.

Figure 3:
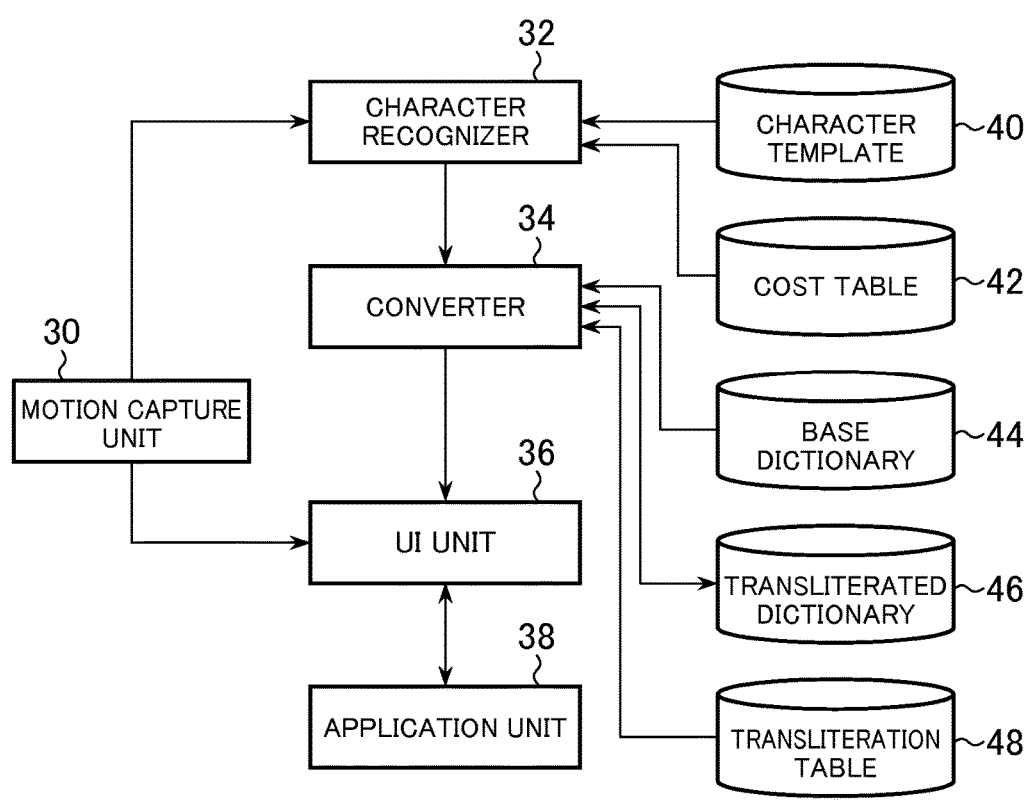
FIG. 3 is a functional block diagram of a user interface device according to the embodiment of the present invention.

FIG. 3 is a functional block diagram of the user interface device 10. As shown in the diagram, the user interface device 10 includes a motion capture unit 30, a character recognizer 32, a converter 34, a user interface unit 36, an application unit 38, a character template storage unit 40, a cost table storage unit 42, a base dictionary storage unit 44, a transliterated dictionary storage unit 46, and a transliteration table storage unit 48. These components are provided by the main unit 16 executing a program according to the embodiment of the present invention. The program may be stored in a computer-readable information storage medium, such as a CD-ROM or a DVD-ROM, and be installed on the main unit 16 from the medium. Alternatively, the program may be downloaded to the main unit 16 via an information communication network, such as the Internet, and then be installed on the main unit 16.

The motion capture unit 30 captures a moving image and depth maps of the user U from the space sensing device 14. The motion capture unit 30 calculates the three-dimensional coordinates of the shoulder near the dominant hand and the dominant hand of the user U from the moving image and the depth maps.

The character recognizer 32 sequentially recognizes characters written by the user U based on the three-dimensional coordinates of the user U's dominant hand. The converter 34 sequentially converts the characters sequentially recognized by the character recognizer 32 into character strings, including a word or a sentence. The user interface unit 36 displays the user interface image shown in FIG. 2 on the screen of the display device 12. To do this, the user interface unit 36 obtains the character strings generated by the converter 34 and then displays them as the selection candidate images 20. The user interface unit 36 also displays the moving image captured by the motion capture unit 30 as a background and displays the position of the user U's dominant hand. Moreover, when the position of the dominant hand is within a predetermined distance from one of the selection candidate images 20, the user interface unit 36 notifies the application unit 38 that the conversion character string corresponding to the selection candidate image 20 was selected.

The application unit 38 performs a predetermined information processing based on the conversion character string provided by the user interface unit 36. This information processing may be any processing, such as a process for searching a database for information using the provided conversion character string as a search key or a process for generating an outgoing message based on the provided conversion character string.

The character template storage unit 40 and the cost table storage unit 42 respectively store character templates (see FIG. 9) and a cost table (see FIG. 10) described below. These are used in a character recognition process performed by the character recognizer 32. The base dictionary storage unit 44, the transliterated dictionary storage unit 46, and the transliteration table storage unit 48 respectively store a base dictionary (see FIG. 15), a transliterated dictionary (see FIG. 17), and a transliteration table (see FIG. 16) described below. These are used in a conversion process performed by the converter 34.

Figure 4:
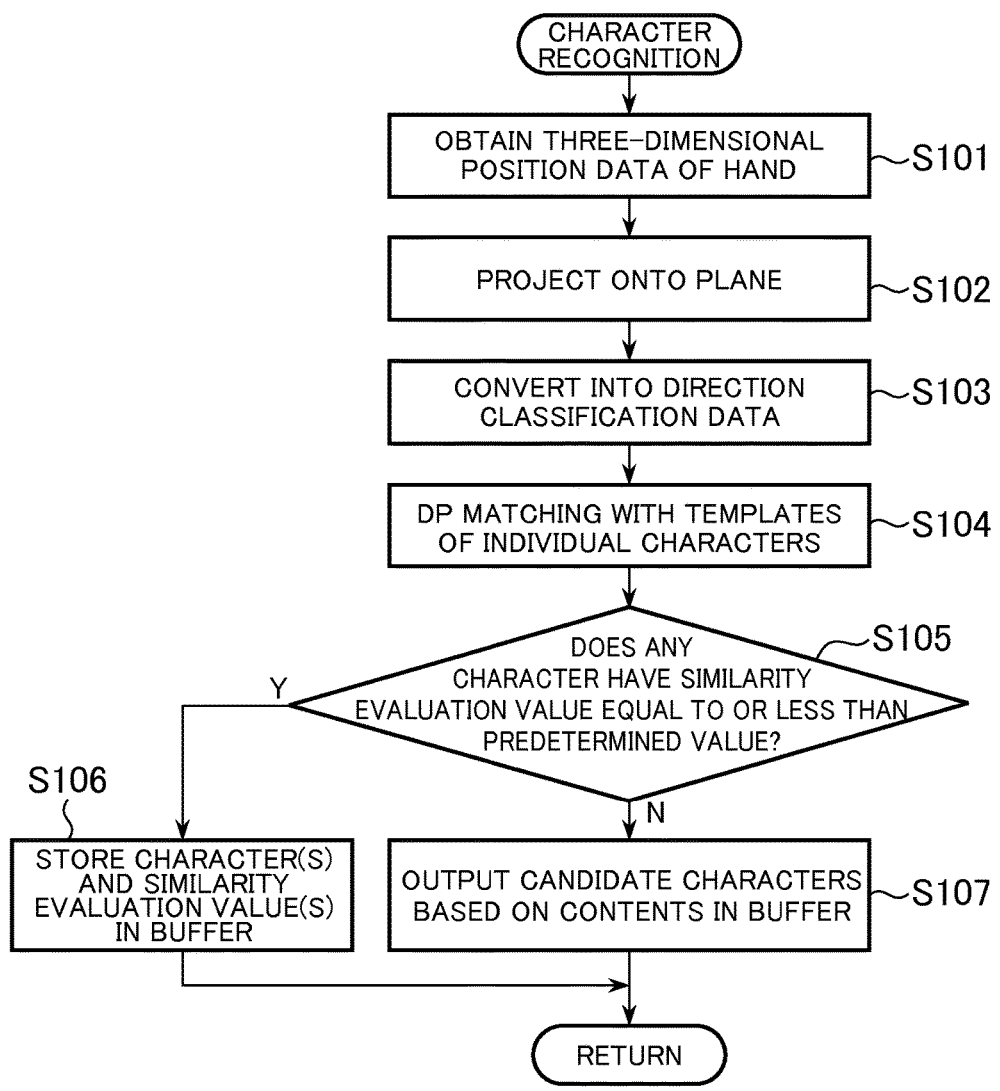
FIG. 4 is a flowchart showing a character recognition process.
Figure 5:
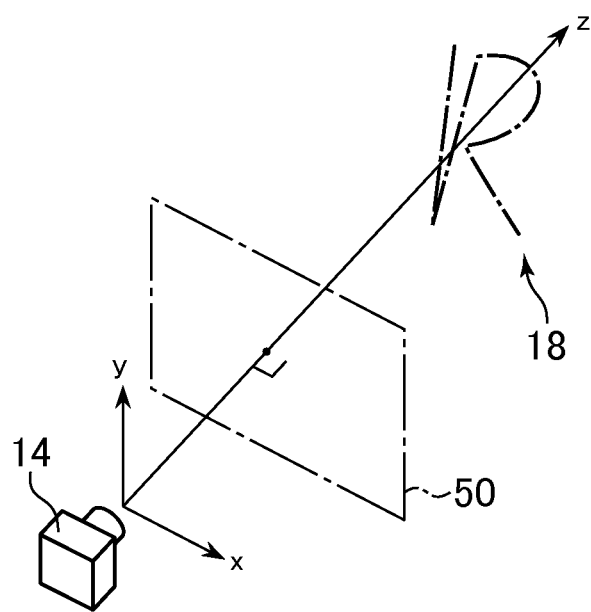
FIG. 5 is a diagram explaining a measurement of a sequence of three-dimensional coordinates indicating a trajectory of a hand.
Figure 6:
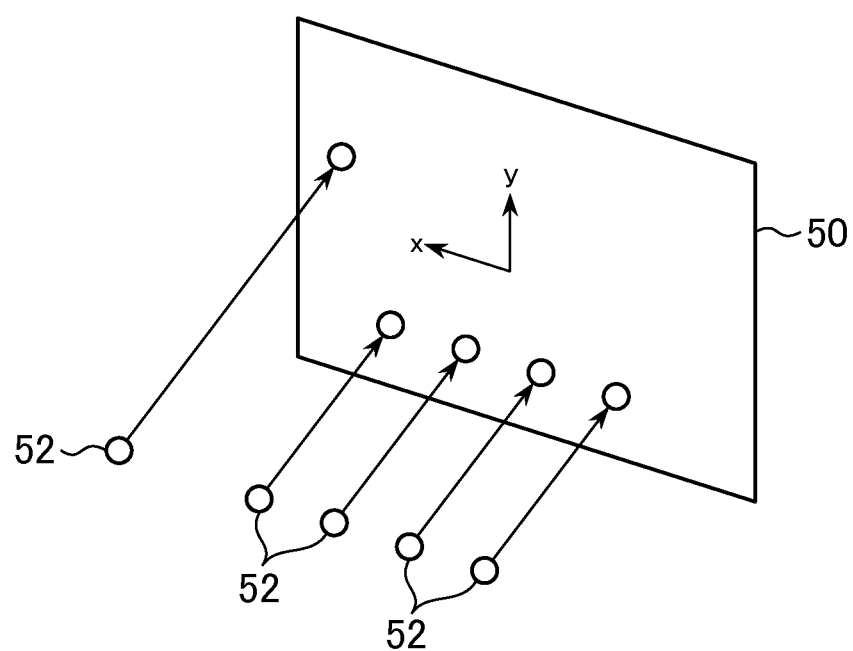
FIG. 6 is a diagram showing a projection of a sequence of three-dimensional coordinates.
Figure 7:
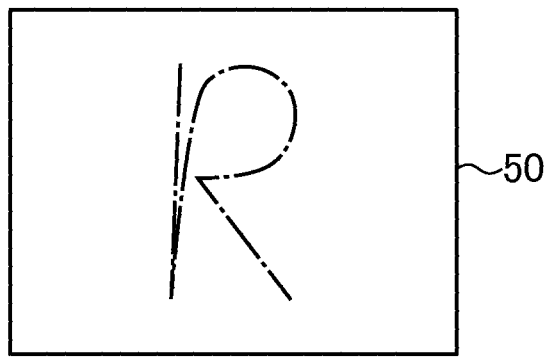
FIG. 7 is a diagram showing a trajectory of a hand projected onto a projection plane.

The character recognition process performed by the character recognizer 32 is now described in detail. FIG. 4 is a flowchart showing the character recognition process performed by the character recognizer 32. The process shown in the figure is performed at predetermined intervals. As shown in the figure, the character recognizer 32 first obtains the latest three-dimensional position coordinates of the dominant hand obtained by the motion capture unit 30 (S101). Next, the character recognizer 32 projects the three-dimensional position coordinates obtained in S101 onto a predetermined projection plane (S102). Specifically, as shown in FIG. 5, a projection plane 50 is defined between a spatial region including the trajectory 18 of the three-dimensional positions of the user U's dominant hand and the position of the space sensing device 14. The projection plane 50 is predefined to be perpendicular to the front direction of the space sensing device 14, where the X-axis is defined in the left-right direction and the Y-axis is defined in the up-down direction. As shown in FIG. 6, the three-dimensional positions 52 of the user U's dominant hand obtained in S101 are projected perpendicularly onto the projection plane 50. FIG. 7 shows an example of the trajectory 18 of the position of the user U's dominant hand projected onto the projection plane 50. The diagram shows the projection plane 50 when the user U writes the letter "R" in the air-writing area.

As shown in FIG. 5, the projection plane 50 here is defined in front of the space sensing device 14 to be perpendicular to the front direction of the space sensing device 14, but the user U does not always write characters facing the space sensing device 14 squarely. For example, if the user U writes characters facing sideways, the trajectory 18 of the position of the user U's dominant hand projected onto the projection plane 50 is squashed left and right, accordingly making it hard to determine which character the user U wrote.

Figure 8:
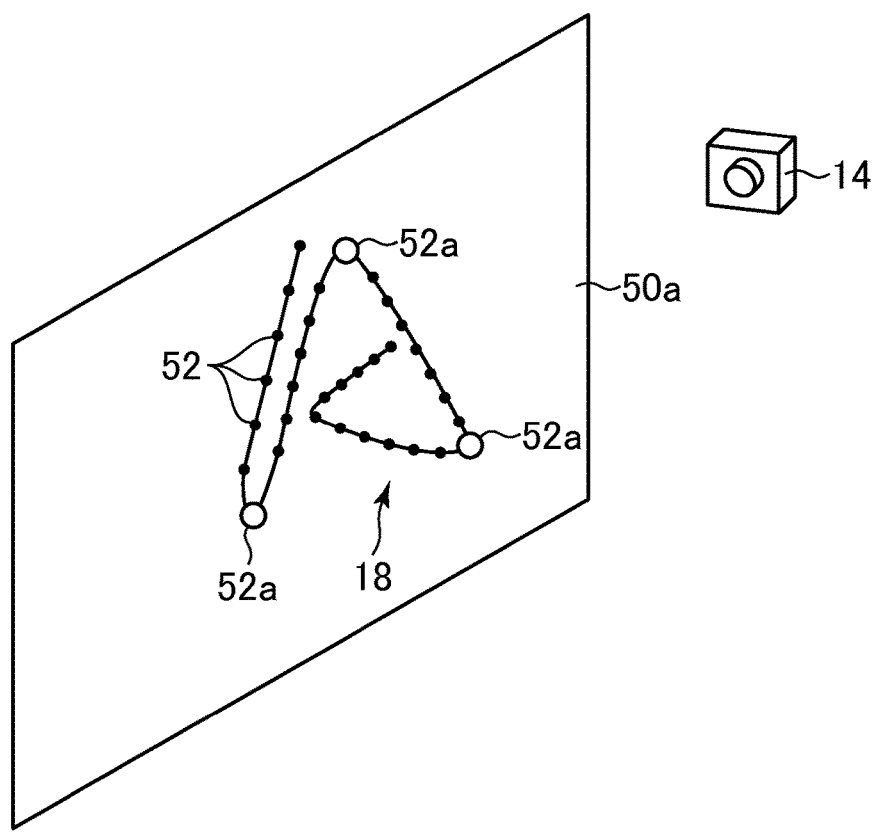
FIG. 8 is a diagram illustrating a modification of the projection plane.

Thus, as shown in FIG. 8, three or more of the three-dimensional positions 52 constituting the trajectory 18 of the user U's dominant hand may be selected, and a plane determined by the selected three-dimensional positions 52 may be defined as a projection plane 50a. In this case, the projection plane 50a is not necessarily defined to be perpendicular to the front direction of the space sensing device 14. The projection plane 50a may be a plane including all of the selected three-dimensional positions 52 or a plane including statistical positions such as the average of the selected three-dimensional positions 52. Alternatively, the projection plane 50a may be a plane parallel to either of those planes. The three-dimensional positions 52 to be selected may be randomly selected from the trajectory 18 or be selected so that predetermined intervals are left between the times at which the positions were obtained. Alternatively, the three-dimensional positions 52 to be selected may be selected so that distances between them are as large as possible in accordance with the distances from each other. Moreover, the projection plane 50a may be a plane passing through feature points on the trajectory 18. The feature points may be determined based on the curvature of each part of the trajectory 18. Alternatively, a plane passing through the feature points on the trajectory may be calculated as the projection plane 50a by using a Hough transform. This enables characters to be correctly recognized even if the user U writes the characters facing in any direction.

Referring back to FIG. 4, the character recognizer 32 then subtracts, from the projected position coordinates at each time, the projected position coordinates obtained just before the time, and thus obtains vector data indicating a moving direction of the position of the body part with which the user U writes characters. The character recognizer further classifies the vector data as any of nine types of directions to obtain direction classification data (S103). That is, if the magnitude of the vector data is less than a predetermined value, the vector data is classified as vector data indicating no movement and is assigned to the direction classification data indicating the classification. This classification is indicated by a black dot (•) in the accompanying drawings. If the magnitude of the vector data is equal to or greater than the predetermined value, the vector data is classified, based on the direction of the vector data, as vector data indicating any of eight directions. That is, if the direction of the vector data is −23° or more and less than +22° from the upward direction (Y direction), the vector data is classified as vector data indicating the upward direction and is assigned to the direction classification data indicating the classification. This classification is indicated by an up arrow in the accompanying drawings. If the direction of the vector data is +22° or more and less than +67°, the vector data is classified as vector data indicating the upper-right direction and is assigned to the direction classification data indicating the classification. This classification is indicated by an upper-right arrow in the accompanying drawings. If the direction of the vector data is +67° or more and less than +112°, the vector data is classified as vector data indicating the right direction and is assigned to the direction classification data indicating the classification. This classification is indicated by a right arrow in the accompanying drawings. If the direction of the vector data is +112° or more and less than +157°, the vector data is classified as vector data indicating the lower-right direction and is assigned to the direction classification data indicating the classification. This classification is indicated by a lower-right arrow in the accompanying drawings. If the direction of the vector data is +157° or more and less than +202°, the vector data is classified as vector data indicating the downward direction and is assigned to the direction classification data indicating the classification. This classification is indicated by a downward arrow in the accompanying drawings. If the direction of the vector data is +202° or more and less than +247°, the vector data is classified as vector data indicating the lower-left direction and is assigned to the direction classification data indicating the classification. This classification is indicated by a lower-left arrow in the accompanying drawings. If the direction of the vector data is +247° or more and less than +292°, the vector data is classified as vector data indicating the left direction and is assigned to the direction classification data indicating the classification. This classification is indicated by a left arrow in the accompanying drawings. If the direction of the vector data is +292° or more and less than +337°, the vector data is classified as vector data indicating the upper-left direction and is assigned to the direction classification data indicating the classification. This classification is indicated by an upper-left arrow in the accompanying drawings.

Next, similarity evaluation values (similarity evaluation information) between input data (data to be evaluated) including a predetermined number of temporally sequential direction classification data having the latest direction classification data at one end and templates of individual characters are calculated. At the start of the character recognition process, the predetermined number of temporally sequential direction classification data do not exist. In such a case, S104 and subsequent steps are skipped and the process is terminated.

Figure 9:
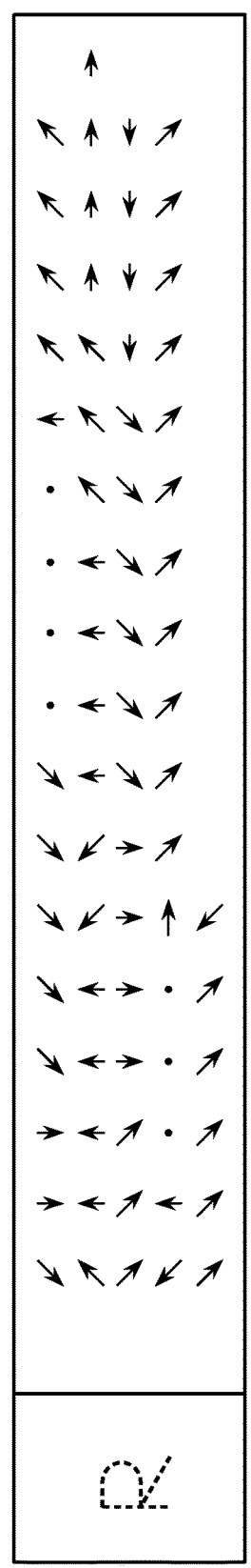
FIG. 9 is a diagram showing an example of a template of a character.

For calculation of the similarity evaluation values, the character template storage unit 40 stores data of the templates schematically shown in FIG. 9 for all characters (here, 34 characters in total: 26 alphabetic letters, numerals from 0 to 9, and a hyphen (-) indicating a long vowel). The templates each indicate changes in the position of the dominant hand when a motion to write a character is made, and include the above direction classification data arranged in temporal order as shown in FIG. 9. The template of each character can be easily obtained by repeating the steps S101 to S103 at predetermined intervals for a motion to write the character in the air made by a person with a normal build. A plurality of templates may be provided for each character.

The cost table storage unit 42 stores data of the cost table schematically shown in FIG. 10. The cost table indicates costs (degrees of separation) between the direction classification data. Here, the cost between the same direction classification data is 0, the cost between direction classification data that indicate adjacent directions is 1, the cost between direction classification data that indicate different directions forming an angle of 90° or more and forming an angle of 135° or less is 2, and the cost between direction classification data indicating opposite directions is 3. The cost between the direction classification data (•) indicating no movement and any other type of direction classification data is 1. For calculation of the similarity evaluation values, these data are accessible to the character recognizer 32.

In DP matching, as conceptually shown in FIG. 11, a matrix in which direction classification data constituting input data are arranged in temporal order on the horizontal axis and direction classification data constituting template data of any single character are also arranged in temporal order on the vertical axis is provided. Then, individual costs for all combinations of the direction classification data constituting the input data and the direction classification data constituting the template data are read from the cost table and are stored in the corresponding matrix elements in the matrix shown in FIG. 11. After that, the matrix element (at the lower right in the diagram) corresponding to a pair of the direction classification data obtained at the latest (newest) time among the direction classification data constituting the input data and the direction classification data obtained at the latest time among the direction classification data constituting the template data is set as an interest element, and the cost (0, here) stored in the interest element is obtained. Next, the interest element is moved to any matrix element that is located over, to the upper left of, or to the left of the matrix element. The cost stored in the interest element is then obtained and added to the previously obtained cost. The interest element is thus moved to the matrix element in the top row, that is, the matrix element corresponding to the direction classification data obtained at the earliest (oldest) time among the direction classification data constituting the template, and then the total cost is obtained. In this case, from among a plurality of routes of the interest element, the route that minimizes the total cost is selected. Then, the total cost of the route, that is, the minimum value of the total cost is defined as the similarity evaluation value between the input data and the template of the character. Here, a smaller similarity evaluation value means a greater similarity. In S104 of FIG. 4, the character recognizer 32 calculates the similarity evaluation values between the input data and the templates of the individual characters in the manner described above. The above DP matching allows for proper character recognition even if there is a gap between the speed of writing characters when their templates were made and the user U's character writing speed.

The character recognizer 32 then determines whether any of the templates has a similarity evaluation value that is equal to or less than a predetermined value (S105). If such a template is found, the character and the similarity evaluation value corresponding to the template are stored in a buffer allocated in a memory of the main unit (S106), and then the process is terminated. If more than one of the templates have a similarity evaluation value that is equal to or less than the predetermined value, all of the characters and the similarity evaluation values corresponding to them are stored in the buffer. Hereinafter, a character corresponding to a template that has a similarity evaluation value that is equal to or less than the predetermined value is referred to as a "detected character". In S105, if it is determined that none of the templates has a similarity evaluation value that is equal to or less than the predetermined value, the converter 34 is activated and the converter 34 outputs data of the candidate character based on the character(s) and similarity evaluation value(s) already stored in the buffer (S107).

Figure 12:
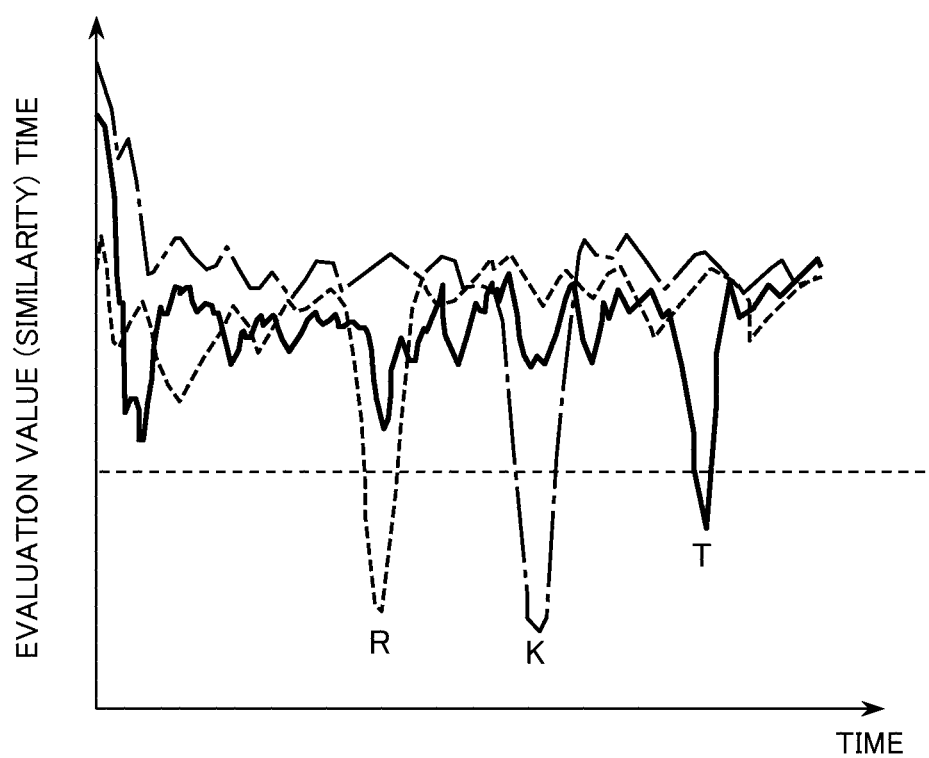
FIG. 12 is a diagram showing changes in similarity evaluation values between input data and templates of individual characters.

FIG. 12 is a diagram showing changes in the similarity evaluation values between the input data and the templates of the individual characters. In the diagram, the horizontal axis shows time, and the vertical axis shows the similarity evaluation value. As described above, the character recognizer 32 calculates the similarity evaluation values between the input data and the templates of the individual characters at the predetermined intervals. Thus, the template(s) with a similarity evaluation value that is equal to or less than the predetermined value appear at a timing the user U finishes writing a character. A case where the user wrote the characters "R", "K", and "T" in this order in the air is shown here. The similarity evaluation values corresponding to these characters drop below the predetermined value and then exceed the predetermined value again one by one. That is, the characters "R", "K", and "T" are detected in this order.

Figure 13:
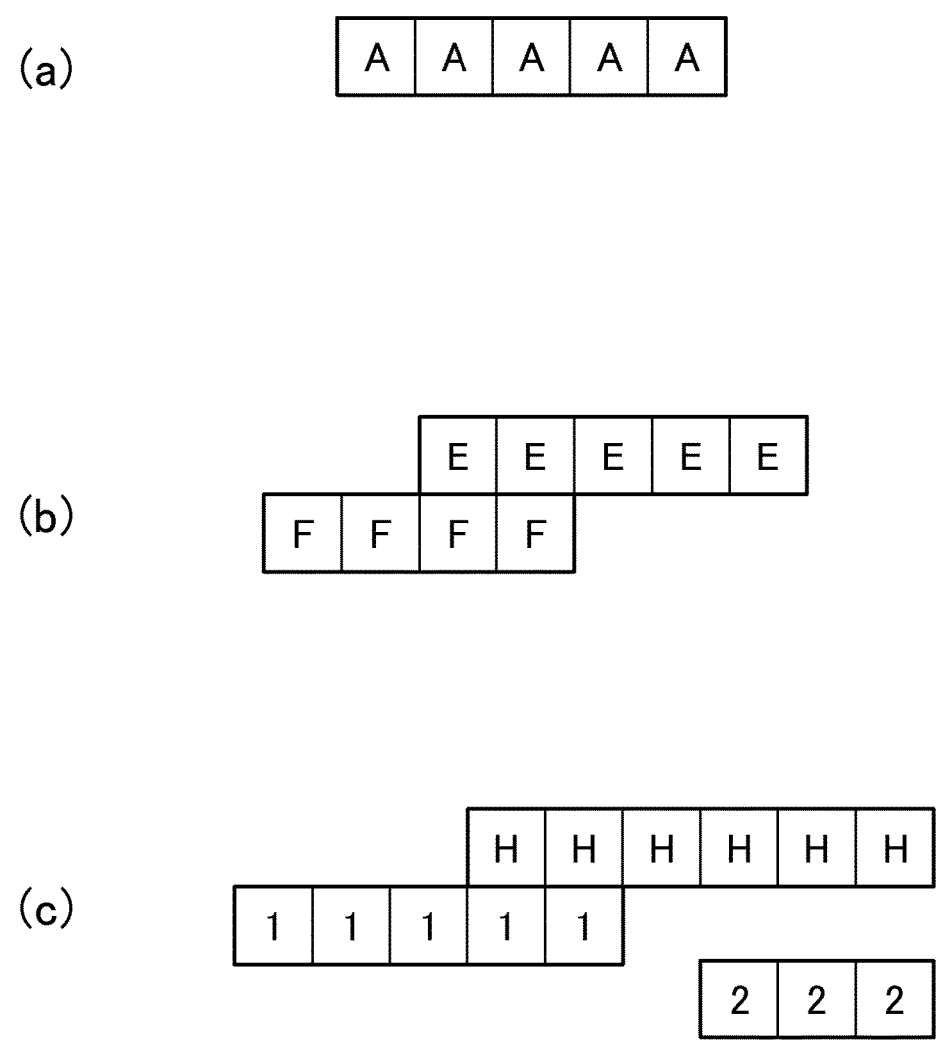

FIG. 13 is a diagram explaining a method for outputting the candidate characters in S107. In the diagram, characters detected during a period from when some character is detected to when no character is detected are shown in order from left to right. In the present embodiment, a period from when some character is detected to when no character is detected is defined as a character determination period.

As shown FIG. 13(a), when only a single character ("A", here) is consecutively detected during a character determination period, the character recognizer 32 outputs the character and its similarity evaluation value as data of the candidate character in S107. The candidate data may be in a predetermined format, for example, ({character:similarity evaluation value}). In the case of FIG. 13(a), it can be expressed as ({A:1.5}). The similarity evaluation value may be the minimum value or a statistical value, such as an average value, of the similarity evaluation values for the character stored in the buffer. In the case of FIG. 13(a), the character recognizer 32 may output the character and its similarity evaluation value as data of the candidate character only when one character is detected at least a predetermined number of, two or more, times (e.g., 3 times) in a row, and may not output data of the candidate character when one character is detected only less than the predetermined number of times in a row. This can prevent false recognition.

As shown in FIG. 13(b), when, during a character determination period, a character ("F", here) is consecutively detected and in the course of the detection another character ("E", here) is detected, the character recognizer may output, only for the following detected character, the character and its similarity evaluation value as the candidate character data. It is because this case is assumed to be a case where the following detected character includes the preceding detected character as part of it. FIG. 13(b) shows an example where "F" is detected while "E" is being written. A case where the following detected character includes the preceding detected character as part of it occurs only when they are a specific pair of characters such as a pair of "E" and "F". Thus, such a pair of the preceding detected character (preceding character) and the following detected character (following character) may be prestored as related characters. Consequently, when, during a character determination period, the prestored preceding character is consecutively detected and in the course of the detection the corresponding following character is detected, the following character and its similarity evaluation value may be output as the candidate character data.

As shown in FIG. 13(c), when, during a character determination period, a character ("1", here) is consecutively detected, in the course of the detection another character ("H", here) is detected, and in the course of the detection still another character ("2", here) is further detected, it is unclear whether the second character ("H", here) was written, or the first character ("1", here) and the third character ("2", here) were successively written. Thus, in the case of FIG. 13(c), both of the above two possibilities are output as the candidate character data. They are in a format, for example, ({character 2:similarity evaluation value 2}|{character 1:similarity evaluation value 1}{character 3:similarity evaluation value 3}). In the case of FIG. 13(c), they can be expressed as ({H:2.0}|{1:1.3}{2:1.0}).

Thus, the character recognizer 32 defines a period from when some character is detected to when no character is detected as a character determination period, and generates the candidate character data based on character detection patterns during the character determination period. This allows for generation of more likely candidate character data.

Figure 14:
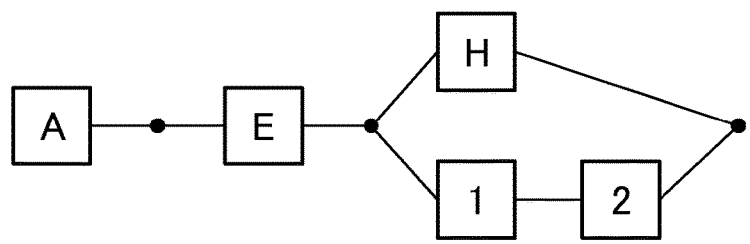
FIG. 14 is a diagram showing candidate character data output from a character recognizer.

FIG. 14 schematically shows candidate character data sequentially output from the character recognizer 32. The diagram shows an example where the candidate character data for the character "A" is output in the situation of FIG. 13(a), then the candidate character data for the character "E" is output in the situation of FIG. 13(b), and finally the candidate character data for the characters "H", and "1" and "2" are output in the situation of FIG. 13(c). In this case, the character recognizer 32 sequentially outputs the candidate character data, such as ({A:1.5}) ({E:1.3}) ({H:2.0}|{1:1.3}{2:1.0}).

Every time the candidate character data is output in the above manner, the converter 34 generates character strings related to gestures of the user U based on the candidate character data already output. For the conversion process performed by the converter 34, the base dictionary storage unit 44, the transliterated dictionary storage unit 46, and the transliteration table storage unit 48 respectively store the base dictionary, the transliterated dictionary, and the transliteration table as described above. As shown in FIG. 15, the base dictionary stores, in association with each of a large number of words, a kana to indicate the pronunciation and a part of speech. The transliteration table, as part of it is shown in FIG. 16, stores, in association with all kana characters, their alphabetic spellings. Here, at least two alphabetic spellings are associated with the characters in the "ka" column to the "wa" column of the kana syllabary. In other words, a spelling in the Hepburn system, that is, a spelling including a consonant followed by a vowel, and a disemvoweled spelling including only consonant(s), two spellings at least, are associated. As for the kana character "し", which is spelled "Shi" in the Hepburn system but "Si" in another system (the Kunrei system), disemvoweled "Sh" and "S" are also associated with the kana character "し". The transliterated dictionary stores, in association with each of the words stored in the base dictionary, alphabetic spellings of the word. Here, the transliterated dictionary is generated by the converter 34, which converts the base dictionary referring to the transliteration table. Specifically, a kana to indicate the pronunciation of a word is read from the base dictionary, and then the individual kana characters constituting the kana to indicate the pronunciation are transliterated into alphabetic spellings in accordance with the transliteration table. As described above, a plurality of alphabetic spellings are associated with many kana characters, and all combinations of alphabetic spellings constituting the kana to indicate the pronunciation of one word are associated with the word in the transliterated dictionary. That is, the transliterated dictionary stores $\Pi n(i)$ alphabetic spellings in association with one word. Here, n(i) is the number of alphabetic spellings associated with the i-th kana character constituting a kana to indicate the pronunciation of a word in the transliteration table. $\Pi$ indicates the product for i from 1 to N, where N is the number of kana characters to indicate the pronunciation.

Figure 18:
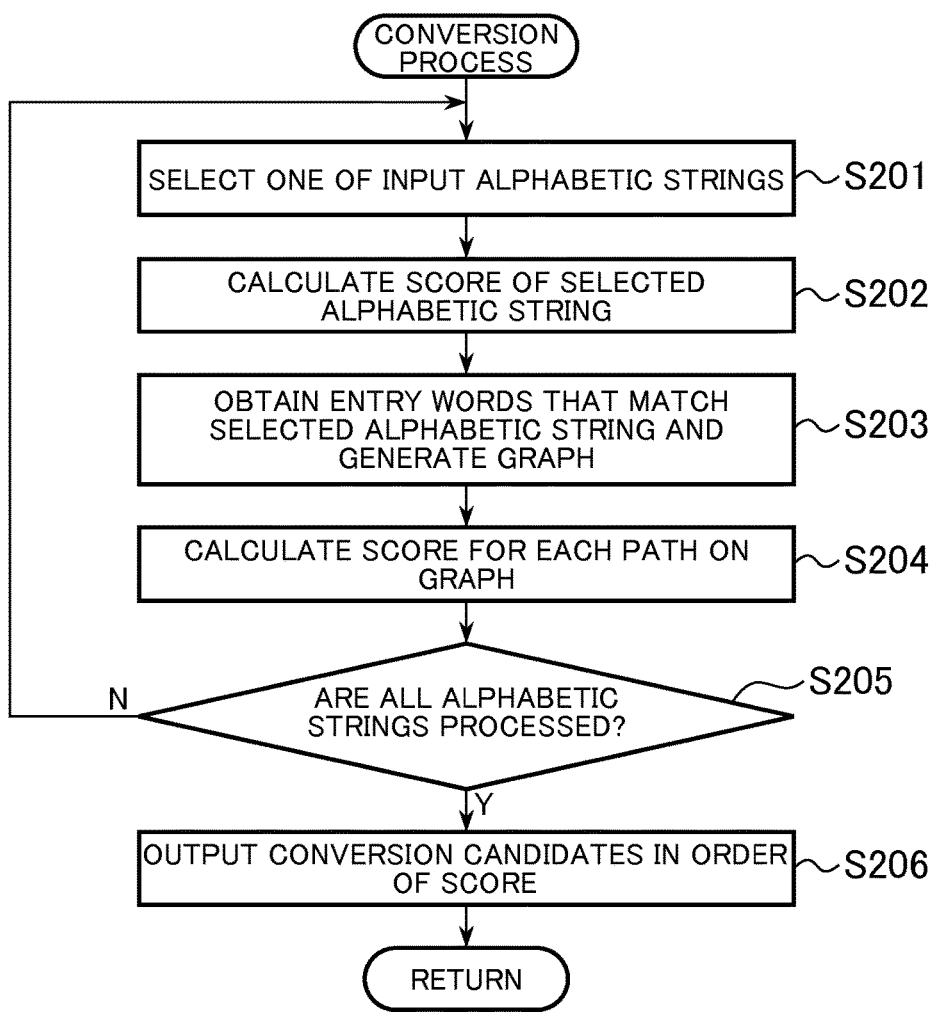
FIG. 18 is a flowchart showing a conversion process.

FIG. 18 is a flowchart showing the conversion process performed by the converter 34. This process is performed every time the character recognizer 32 outputs candidate character data. First, one of alphabetic strings generated from candidate character data already output from the character recognizer 32 is selected (S201). For example, from the candidate character data shown in FIG. 14, two alphabetic strings "AEH" and "AE12" are generated, and one of them is selected. That is, the converter 34 generates the alphabetic strings by sequentially joining the alphabetic characters indicated by the candidate character data. When one piece of candidate character data indicates the possibility that a plurality of alphabetic characters or strings were written, the converter 34 selectively uses and joins them with an alphabetic character or a string indicated by other candidate character data to generate a plurality of alphabetic strings (primary character strings), and selects one of them.

Figure 19:
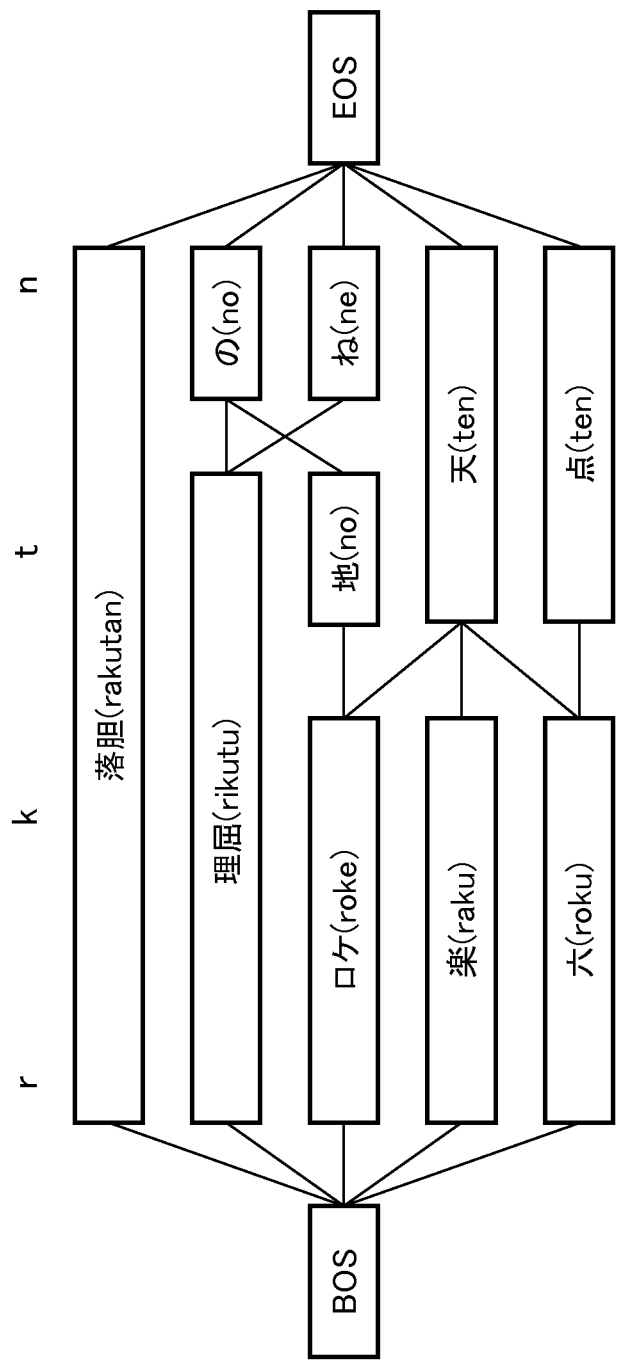
FIG. 19 is a diagram showing a graph structure of candidate conversion words.

Next, a first score of the alphabetic string selected in S201 is calculated (S202). For example, the similarity evaluation values corresponding to individual characters constituting the alphabetic string are extracted from the candidate character data, and the first score is calculated by multiplying their inverses together. Moreover, which words or word strings correspond to the alphabetic string selected in S201 is determined, and a graph of them, that is, data indicating a connection between them is generated (see FIG. 19).

Specifically, alphabetic strings that match the entirety or any length of the beginning of the alphabetic string selected in S201 are retrieved from the transliterated dictionary, and words (entry words in the transliterated dictionary) associated with the retrieved alphabetic strings are obtained. When the transliterated dictionary stores the alphabetic strings that match the entirety or any length of the beginning of the alphabetic string selected in S201, the alphabetic strings that match the entirety or any length of the beginning of the remaining portion are retrieved from the transliterated dictionary, and the words associated with the retrieved alphabetic strings are obtained. Thus, the words or the word strings (candidate character strings related to the gestures of the user U) corresponding to the alphabetic string selected in S201 are obtained.

Then, the converter 34 calculates second scores for all of the words or the word strings corresponding to the alphabetic string selected in S201 (S204). For example, the second score for each of the words or the word strings can be calculated based on the frequency of appearance of the word or the string, how likely it is to be Japanese, the part-of-speech order of individual words, and the like.

Furthermore, total scores (candidate evaluation values) are calculated for all of the words or the word strings corresponding to the alphabetic string selected in S201. The total scores can be calculated, for example, by multiplying or adding the first score and the second score together. The steps S201 to S204 are repeated for all of the alphabetic strings generated in S201 (S205). Then, a predetermined number of the words or word strings taken in descending order of the total scores are output (S206).

The user interface unit 36, as described above, displays the user interface image shown in FIG. 2 on the screen of the display device 12 based on the words or the word strings output by the converter 34 and the moving image captured by the motion capture unit 30. The user interface unit 36 also displays the position of the user U's dominant hand obtained by the motion capture unit 30.

Figure 20:
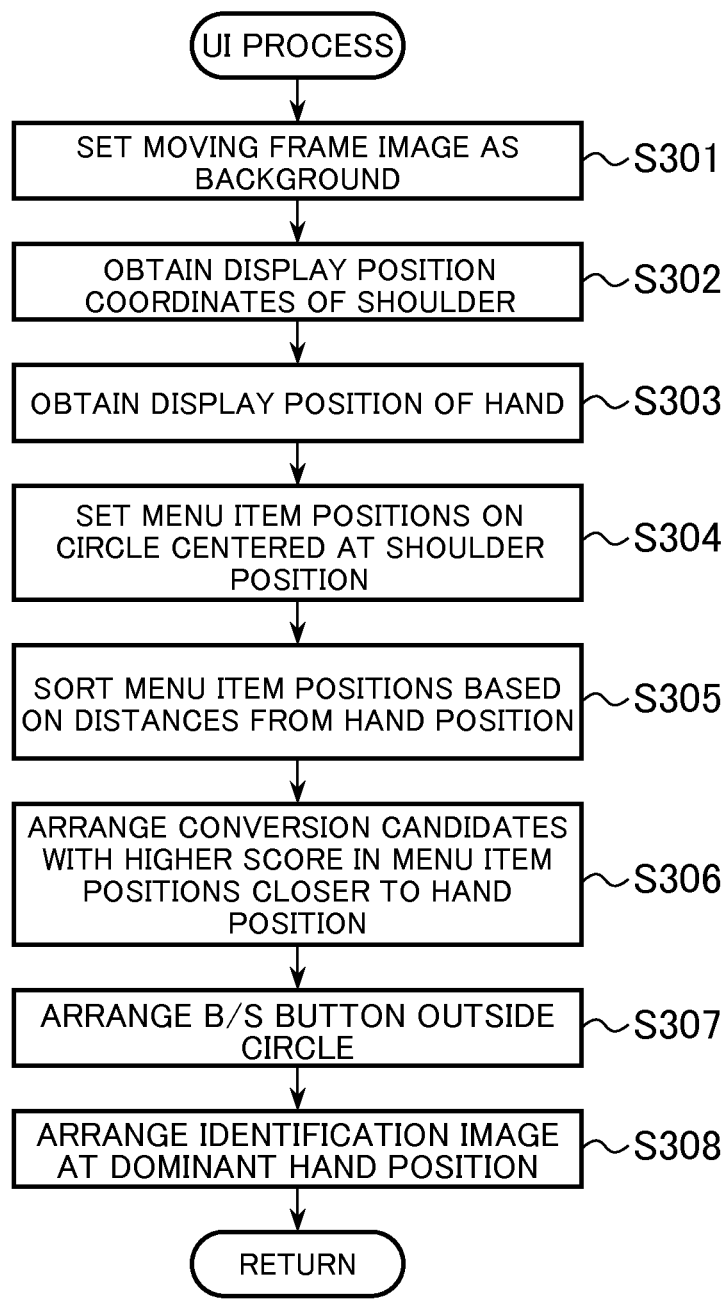
FIG. 20 is a flowchart showing a user interface process.

FIG. 20 is a flowchart showing a user interface process performed by the user interface unit 36. The process shown in the figure is performed at predetermined intervals. First, the latest frame image constituting the moving image output from the motion capture unit 30 is rendered as a background on a memory (S301). Next, the position coordinates of the shoulder near the user U's dominant hand in the frame image obtained from the motion capture unit 30 are obtained (S302). The position coordinates of the user U's dominant hand in the frame image is also obtained (S303). Then, which positions, on the circumference of the circle 26 centered at the position coordinates of the shoulder near the dominant hand obtained in S302, the selection candidate images 20 are arranged in are determined (S304). The positions of the selection item images 20 may be determined so that the images are evenly spaced on the circumference of the above circle 26. Subsequently, the distances between the position of the dominant hand obtained in S303 and the individual positions determined in S304 are calculated, and the individual positions determined in S304 are sorted in order of the calculated distances (S305). The words or the word strings output from the converter 34 are then arranged in the positions determined in S304 so that those with a higher total score are arranged closer to the position of the dominant hand (S306). Moreover, the button image 28 for activating the specific function is arranged outside the circle 26 (S307). An identification image, such as an O mark, is also arranged at the position of the user U's dominant hand obtained in S303. In the above manner, the user interface image shown in FIG. 2 is generated and then displayed on the screen of the display device 12.

Figure 21:
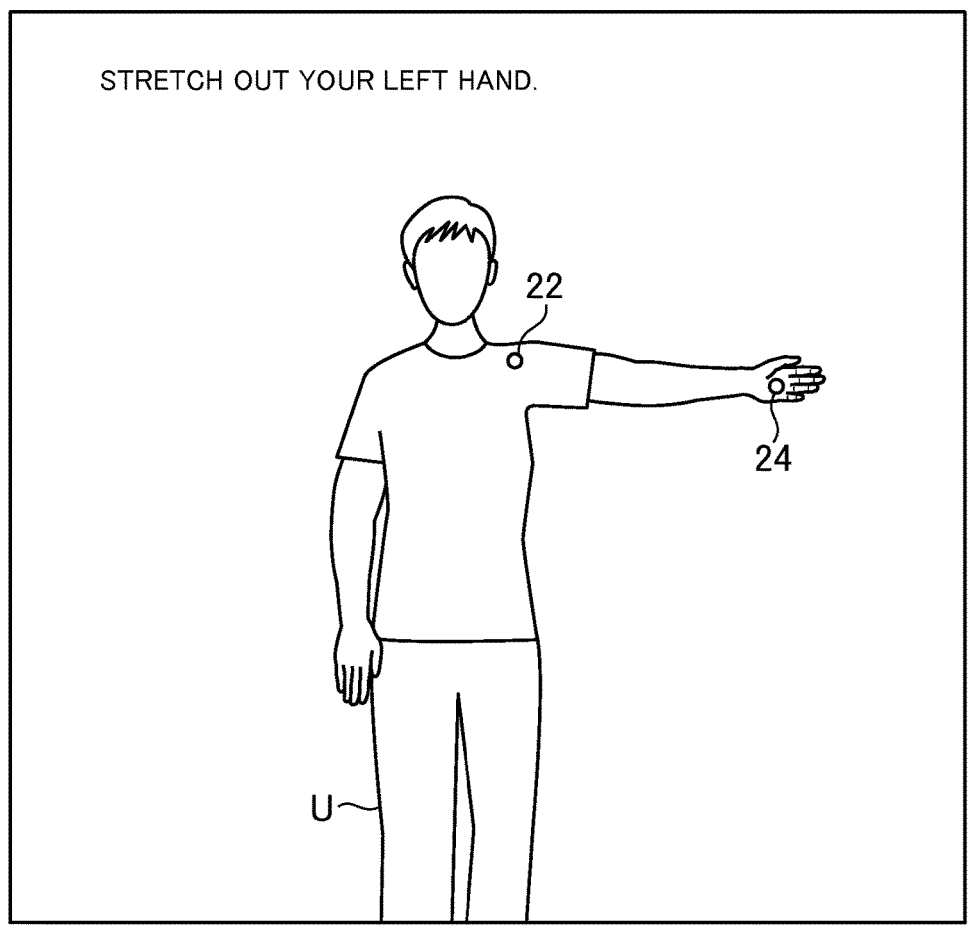
FIG. 21 is a diagram showing an example of a user interface screen for inputting an arm length.

As described above, the diameter of the circle 26 may be determined based on the length of the user U's arm when displayed on the screen or based on the average length of human arms when displayed on the screen. To use the length of the user U's arm when displayed on the screen as a reference length, a message requesting the user U to stretch out his/her dominant hand may be displayed as shown in FIG. 21, and the distance between the position 24 of the dominant hand and the position 22 of the shoulder near the dominant hand may be obtained.

In the user interface device 10 described above, every time the position of the dominant hand, which is the writing position, is obtained, input data including the predetermined number of the positions of the dominant hand taken in order from a newly obtained position is generated, and the similarity evaluation values between the input data and the templates of the individual characters are calculated. Then, every time the position of the dominant hand, which is the writing position, is obtained, character strings related to the gestures of the user U are determined based on the similarity evaluation values. Thus, even without an explicit operation performed at the timing to begin writing each character and at the time to finish writing the character, a plurality of characters can be sequentially recognized, and an extremely user-friendly user interface can be provided.

The transliterated dictionary stores an alphabetic string including only consonant(s) in association with each entry word. Thus, the user U can obtain an intended character string by inputting just a few characters. The transliterated dictionary stores not only the alphabetic string including only consonant(s) but also alphabetic string(s) including consonant(s) and vowel(s) in association with each entry word. Thus, the user U can obtain an intended character string even if inputting an alphabetic string including consonant(s) and vowel(s) by mistake.

Additionally, the selection candidate images 20, which are the selection elements, are displayed based on the position of the shoulder near the user U's dominant hand. Thus, the user U can easily select each of the selection candidate images 20.

The present invention is not limited to the embodiment described above, and various modifications may be made.

For example, in the above description, the selection candidate images 20 are arranged on the circumference of the circle centered at the position of the user U's shoulder, whereas the selection candidate images 20 may be arranged on an elliptical arc. Alternatively, the selection candidate images 20 may be arranged on various curves or straight lines that are arranged apart from the position of the user U's shoulder based on the position. Instead of using the position of the shoulder near the dominant hand as a reference position, the position of the elbow near the dominant hand may be used as the reference position. Arranging the selection candidate images 20 in positions apart from the position of a reference joint, such as a shoulder or an elbow, that is nearer to the trunk than the position of a hand, a finger, or a writing instrument, which is the writing position and the selection position, enables the user U to easily select the selection candidate images 20.

In the above description, the transliterated dictionary is generated from the base dictionary and the transliteration table. Alternatively, only the transliterated dictionary that has been generated is stored in the user interface device 10. When a user freely adds an entry word and a kana to indicate the pronunciation in the base dictionary, alphabetic strings corresponding to the added entry word may be generated in accordance with the transliteration table and be registered in the transliterated dictionary. The entry words in the transliterated dictionary are not limited to the entry words in the base dictionary, and may be any character strings.

Some users correctly input character strings by using only consonants, and do not use the input with consonants and vowels. By contrast, other users do only the input with consonants and vowels, and do not use the input by using only consonants. Thus, depending on characters input by gestures of the user U, either alphabetic strings including both consonant(s) and vowel(s) or alphabetic strings including only consonant(s), among the alphabetic strings corresponding to the entry words in the transliterated dictionary, may be removed. In this case, those alphabetic strings may be directly removed from the transliterated dictionary. Alternatively, the transliterated dictionary may be generated again from the base dictionary and the transliteration table so as to include only either the alphabetic strings including both consonant (s) and vowel (s) or the alphabetic strings including only consonant(s).

While the above describes an example where the alphabet, numerals, and a hyphen are input by gestures of a user and are converted into Japanese character strings, the present invention can be applied to various characters and various languages. For example, characters to be provided with templates may be selected from among all characters in any language, including the Japanese language. This enables various characters provided with the templates to be recognized from the gestures of the user U.

The entry words in the transliterated dictionary may be any language, other than Japanese, in which consonants and vowels are separated. For example, if the transliterated dictionary stores, in association with English words in full spelling as the entry words, the corresponding alphabetic strings including only consonant(s) and the corresponding alphabetic strings including consonant (s) and at least one vowel, any English word can be entered into the system by sequentially inputting an alphabetic string including only consonant(s) or an alphabetic string including consonant(s) and at least one vowel. For example, if the transliterated dictionary stores "Jpn", "Japn", "Jpan", and "Japan" are stored in association with the entry word "Japan", an alphabetic string including a vowel, for example, "Japn" involuntarily input by the user U can also be converted into "Japan" correctly. When English words are used as the entry words, a word including a vowel at its beginning, such as "image", the alphabetic string "img", including a vowel only at its beginning and excluding the other vowels, may be stored in the transliterated dictionary in place of the alphabetic string "mg", including only consonants.

The invention claimed is:

1. A user interface device comprising:
   an image capturing unit configured to capture an image of a user viewing a display screen;
   a recognition unit configured to recognize a position of a reference part of the user's body appearing in the captured image and further configured to recognize a selection object, the selection object being used to select a first selection element displayed on the display screen;
   a display position determination unit configured to determine display positions of the first selection element and a plurality of other selection elements, based on the position of the reference part appearing in the image and further based on a final score for each selection element; and
   wherein the display screen is configured to display the first selection element and the plurality of selection elements in the determined display positions;
   wherein the display position determination unit determines a position of a line arranged at a given distance from where the reference part is displayed;
   wherein an area closer to the reference part, as compared to the line, is defined as a user gesture area;
   wherein a character written in the air by said user in the user gesture area is recognized as said character by the recognition unit;
   wherein the plurality of other selection elements and the first selection element displayed on the display screen are determined based on the character recognized by the recognition unit; and
   wherein the selection object is part of the user's body and is different from the reference part.

2. The user interface device according to claim 1, wherein the reference part is a joint of the user's hand or arm.

3. The user interface device according to claim 2, wherein the reference part is the user's shoulder.

4. The user interface device according to claim 1, wherein a button image is displayed in an area outside the line when viewed from the position at which the reference part is displayed.

5. The user interface device according to claim 1, further comprising:
   a distance calculation unit configured to calculate a distance between the selection elements and the position at which the reference part is displayed, wherein
   the given distance is determined based on the calculated distance.

6. The user interface device according to claim 1, wherein the line is in a form of a circular arc or an elliptical arc.

7. The user interface device according to claim 1, wherein the recognition unit recognizes the three-dimensional position coordinates of main body parts of the user based on the image obtained by the image capturing unit, the selection position is obtained by projecting the three-dimensional positions onto a projection plane virtually arranged in front of the image capturing unit.

8. The user interface device according to claim 1, wherein the display screen is configured to display a message requesting the user to stretch out his/her dominant hand,
   and wherein the user interface device is configured to determine a distance between the user's dominant hand and the user's corresponding shoulder.

9. A user interface method comprising:
   capturing an image of a user viewing a display screen;
   recognizing a position of a reference part of the user's body appearing in the captured image and further configured to recognize a selection object, the selection object being used to select a first selection element displayed on the display screen;
   determining display positions of a plurality of selection elements, including the first selection element, based on a final score for each selection element such that selection elements with a higher score are positioned closer to the selection object than selection elements with a lower score; and
   displaying the plurality of selection elements in the determined display positions;
   determining a position of a line arranged at a given distance from where the reference part is displayed;
   wherein an area closer to the reference part, as compared to the line, is defined as a user gesture area;
   wherein a character written in the air by said user in the user gesture area is recognized as said character; and
   wherein the plurality of selection elements displayed on the display screen are determined based on the character recognized by the recognition unit.

10. The method according to claim 9, further comprising:
    calculating a first score of each of the plurality of selection elements based on a similarity value between individual characters recognized by character recognition unit and candidate words and phrases,
    wherein the first score is used to determine the final score for each of the plurality of selection elements.

11. The method according to claim 10, further comprising:
    calculating a second score of each of the plurality of selection elements based on a frequency value between said candidate words and phrases,
    wherein the second score is used to determine the final score for each of the plurality of selection elements.

12. The method according to claim 11, wherein said final score is an arithmetic combination of said first score and said second score.

13. A non-transitory computer-readable information storage medium storing a program for causing a computer to function as:

an image capturing unit configured to capture an image of a user viewing a display screen;

a recognition unit configured to recognize a position of a reference part of the user's body appearing in the captured image and further configured to recognize a selection object, the selection object being used to select a first selection element displayed on the display screen;

a display position determination unit configured to determine display positions of a plurality of selections elements, including the first selection element, based on the position of the reference part appearing in the image, and also based on a final score for each respective selection element; and wherein the display screen configured to display the plurality of selection elements, including the first selection element in the determined display positions, wherein the display position determination unit determines a position of a line arranged at a given distance from where the reference part is displayed;

wherein an area closer to the reference part, as compared to the line, is defined as a user gesture area;

wherein a character written in the air by said user in the user gesture area is recognized as said character by the recognition unit;

wherein the plurality of selection elements displayed on the display screen are determined based on the character recognized by the recognition unit; and wherein the selection object is part of the user's body and is different from the reference part.

* * * * *